INVENTOR.
PETER G. WHITE
BY FOWLER, KNOBBE
& MARTENS
ATTORNEYS.

April 7, 1970  P. G. WHITE  3,504,975
IMAGE SPECTROPHOTOMETER FOR ANALYZING VEGETATION
Filed Nov. 18, 1966  6 Sheets-Sheet 2

INVENTOR.
PETER G. WHITE
BY
FOWLER, KNOBBE
& MARTENS.
ATTORNEYS.

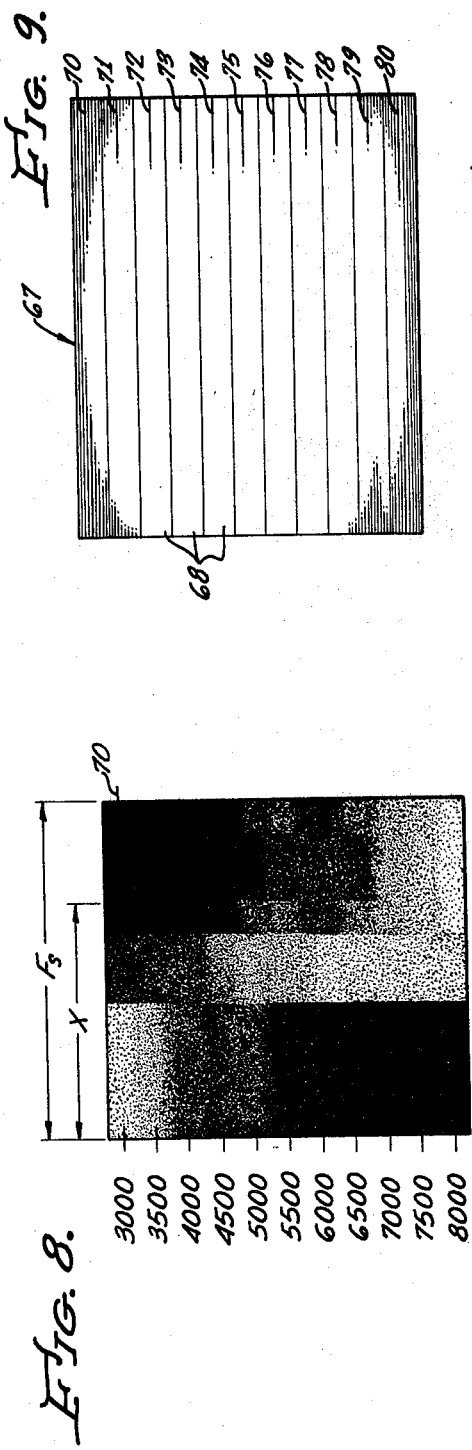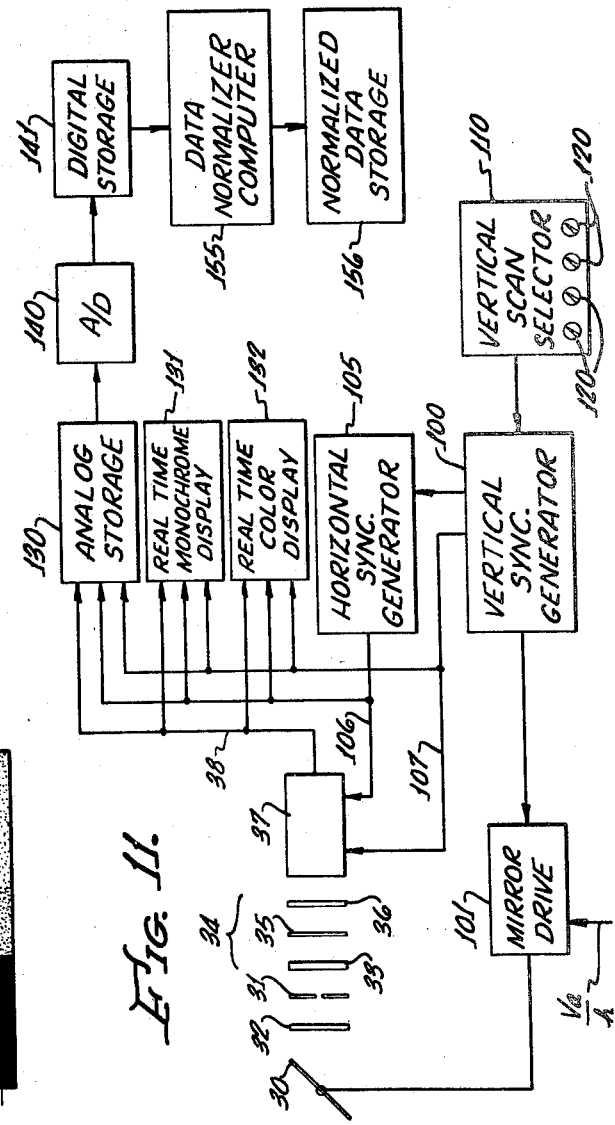

April 7, 1970 P. G. WHITE 3,504,975
IMAGE SPECTROPHOTOMETER FOR ANALYZING VEGETATION
Filed Nov. 18, 1966 6 Sheets-Sheet 4

INVENTOR.
PETER G. WHITE
BY FOWLER, KNOBBE & MARTENS
ATTORNEYS.

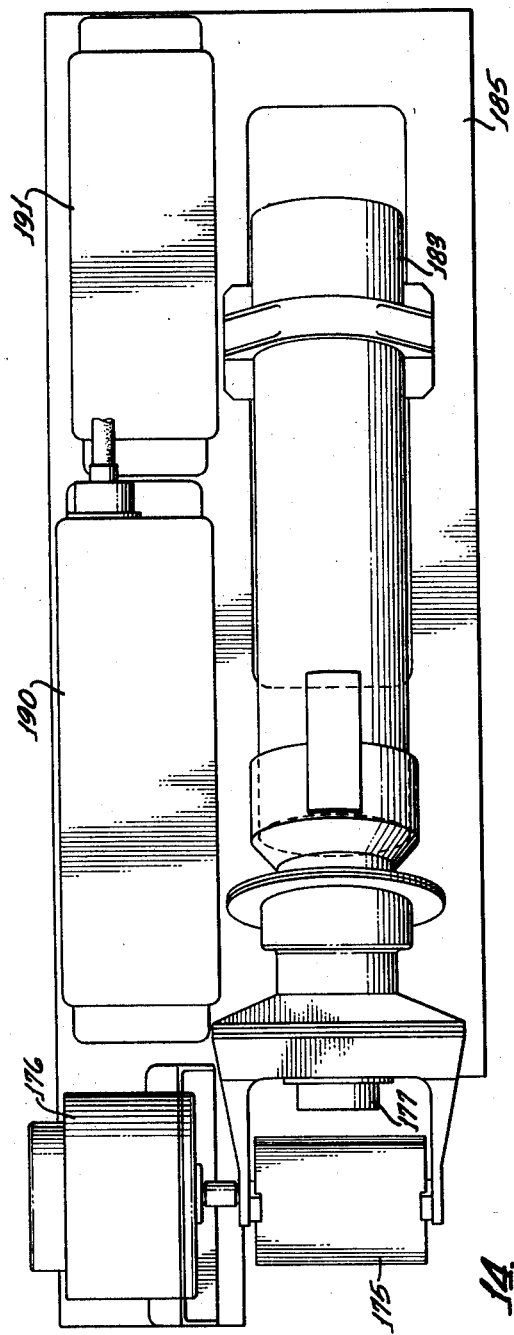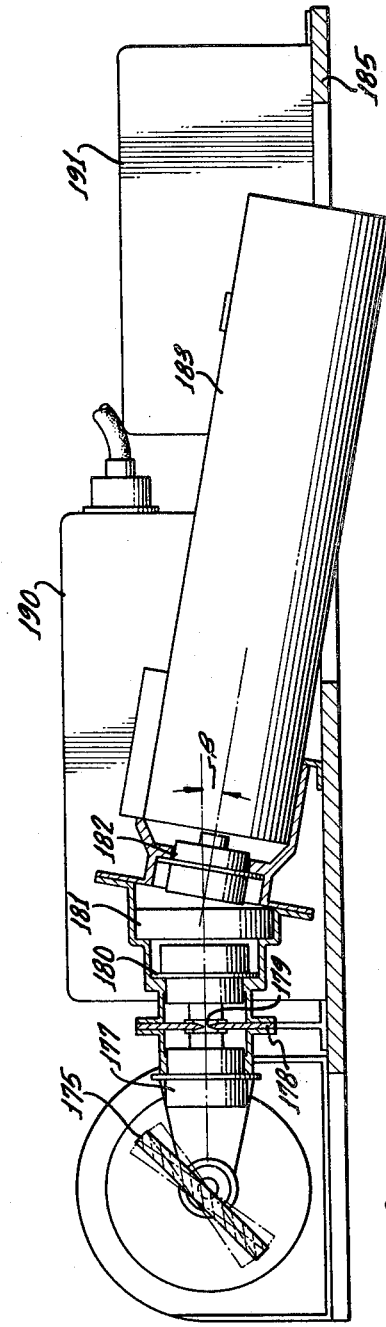

April 7, 1970   P. G. WHITE   3,504,975
IMAGE SPECTROPHOTOMETER FOR ANALYZING VEGETATION
Filed Nov. 18, 1966

INVENTOR.
PETER G. WHITE
BY FOWLER, KNOBBE
& MARTENS
ATTORNEYS.

United States Patent Office 3,504,975
Patented Apr. 7, 1970

3,504,975
IMAGE SPECTROPHOTOMETER FOR ANALYZING VEGETATION
Peter G. White, Palos Verdes Peninsula, Calif., assignor to TRW Inc., Redondo Beach, Calif., a corporation of Ohio
Filed Nov. 18, 1966, Ser. No. 595,428
Int. Cl. G01j 3/42; H04n 3/08
U.S. Cl. 356—83                    30 Claims

ABSTRACT OF THE DISCLOSURE

Method and apparatus wherein an elemental image of a scene is optically formed. The elemental image is then dispensed into its spectrum which is focused onto the photosensitive surface of a scanning image tube. Scanning then takes place along selected linear paths corresponding to regions of substantially constant wavelengths of the spectrum formed in the photosensitive surface to produce an electrical waveform which varies in accordance with the intensity of the impinging radiation upon the photosensitive surface within the linear paths.

---

This invention relates to improved systems and methods for viewing a scene and obtaining therefrom spatially-oriented spectral information of high resolution.

Although of general utility, this invention is especially adapted for accurately discriminating between various objects in the scene, particularly as to objects which are difficult to distinguish by visual viewing or photographic techniques.

The traditional techniques for object discrimination have involved the utilization of spatial data and include shape correlation, feature extraction and image quantization. These means have been assisted by employing photographic techniques for increasing the contrast between objects and backgrounds by selecting photographic film and optical filters for distinguishing between gross spectral differences between the objects and their backgrounds. Spatial data, however, no matter how accurately obtained, suffers from the inherent difficulty that the same object in the spatial domain may have a number of sizes, shapes and orientations.

The present invention exploits the fact that the spectral characteristics of an object are invariant under spatial variations thereby providing a unique spectral signature for each object regardless of size, shape or orientation. This is accomplished by optically scanning the scene and forming a series of elemental images of the scene. The elemental image is then dispersed into a spectrum and the resultant spectrum is electronically scanned for converting the light intensity along selected wavelength portions of the spectrum into a corresponding electrical signal. The latter means is most effectively provided by using a television tube in which only preselected horizontal lines respectively corresponding to spectral lines of constant wavelength are scanned rather than the entire raster. The radiation along the path of the scan is spatially oriented to the electrical image so that the radiation detected at any point along each scanning line corresponds to the reflectance radiation of a predetermined wavelength from a corresponding point of the elemental image. The resulting electrical signal may be either stored for subsequent study or applied to a television display for viewing the scene in near real time.

An advantage of the present invention is that instruments may be constructed in accordance therewith for sensing a few or even a single spectral band of high resolution, e.g. 5 A., or for sensing a substantial plurality of spectral bands of equally high resolution. The resultant data in electrical form may be reconverted into pictures of the scene in any one of the selected spectral bands or the spectral energy in selected ones of the bands may be numerically processed for automatic detection of predetermined phenomena.

A more thorough understanding of the present invention may be obtained from the following detailed description taken in connection with the accompanying drawings, in which:

FIG. 8 illustrates a typical spectrum resulting from the dispersion of the elemental image across the sensitive face of the image tube in the embodiment of FIG. 4;

FIG. 9 illustrates the raster of the image tube and the preselection of lines thereof for scanning the spectrum of FIG. 8;

Figure 4:
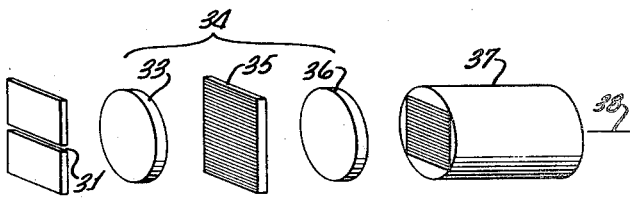
FIG. 4 is a schematic, blown-up view in perspective of the preferred embodiment of an image spectrophotometer constructed in accordance with this invention.
Figure 10:
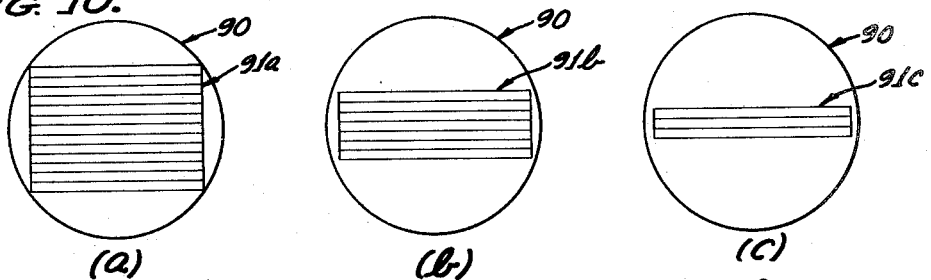
Figure 12:
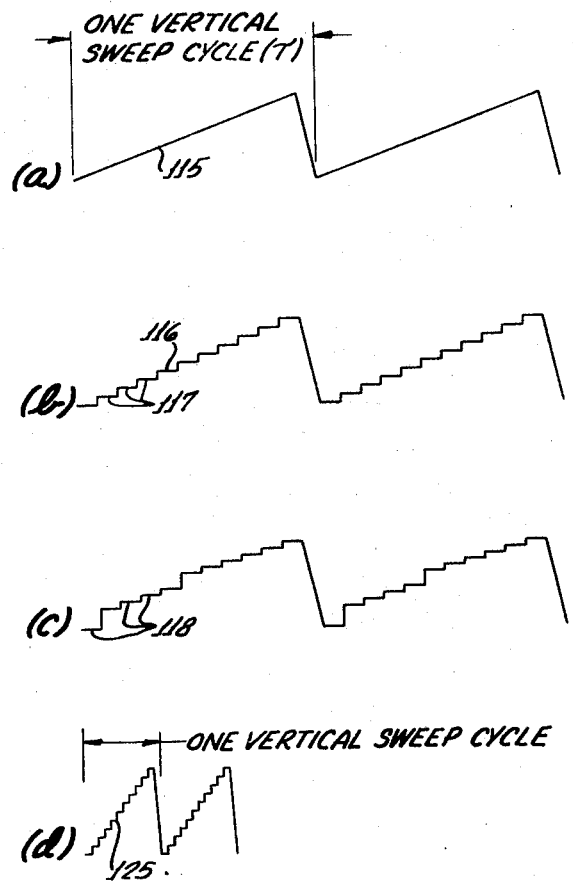
Figure 13:
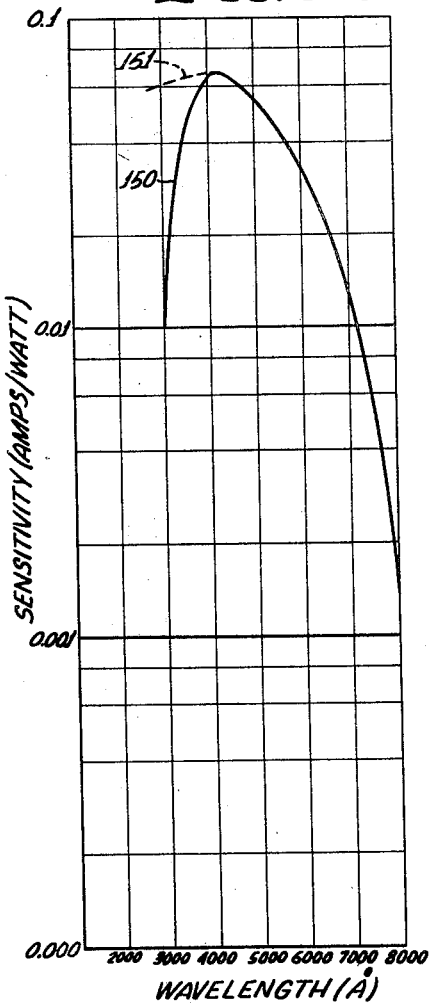
Figure 16:
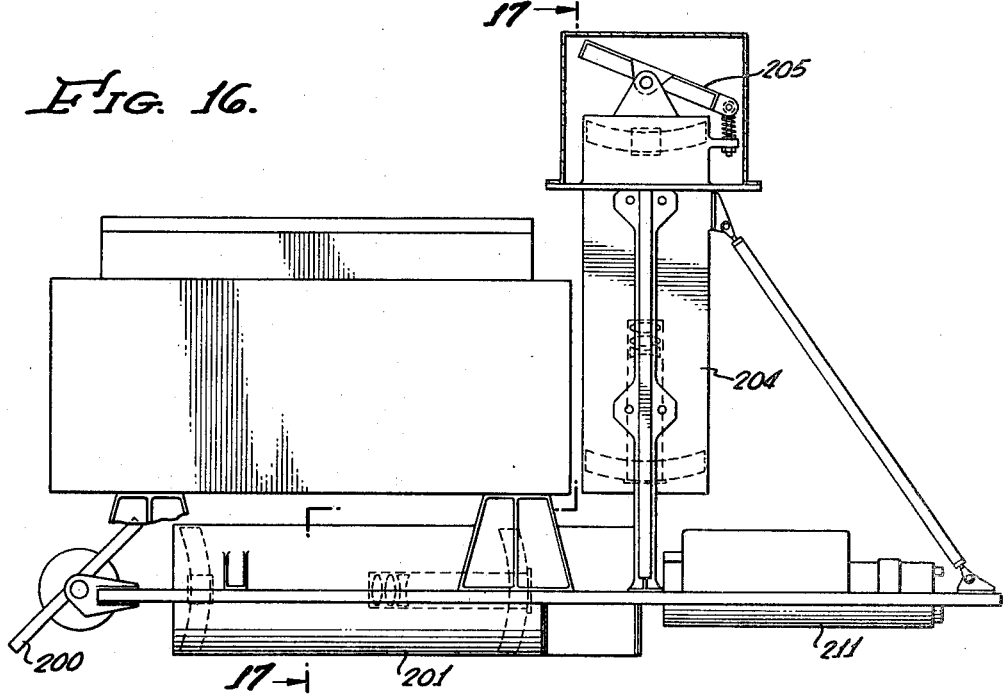
Figure 18:
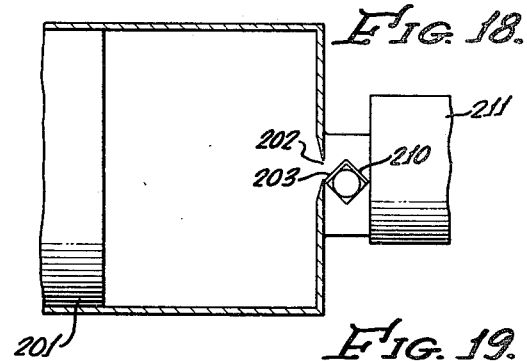
Figure 17:
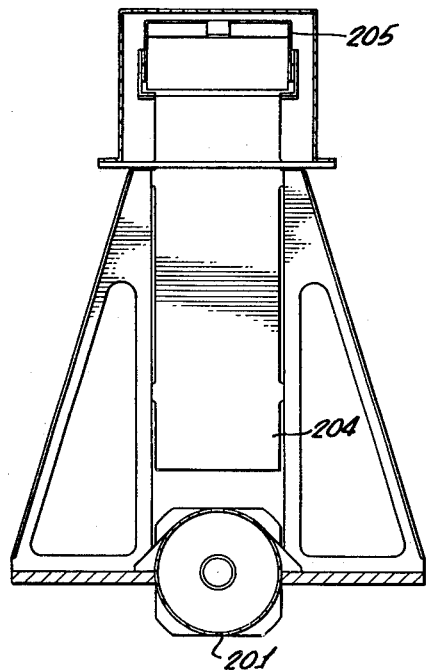
Figure 19:
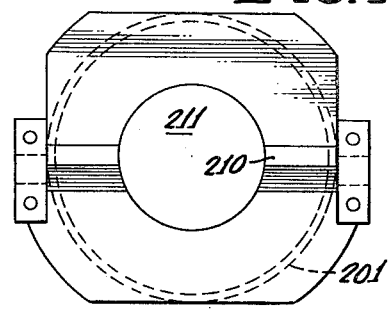

FIGS. 10a, b and c illustrate the variation in spectral resolution which may be achieved by varying the amount of dispersion of the instrument of FIG. 4;

FIG. 11 is a block diagram of a system incorporating the image spectrophotometer of FIG. 4 including means for storing and displaying the electrical output signal of the image tube;

FIGS. 12a, b, c, and d illustrate different vertical sweep waveforms for driving the image tube of the system of FIG. 11;

FIG. 13 illustrates a typical spectral response curve for a photocathode tube which may be employed in the systems of FIGS. 4 and 11;

FIG. 14 is a plan view of a detailed embodiment of an image spectrophotometer of short focal length constructed in accordance with the present invention;

FIG. 15 is a side elevation view of the embodiment of FIG. 14;

FIG. 16 is a side elevation view of a detailed embodiment of an image spectrophotometer of long focal length constructed in accordance with the present invention;

FIG. 17 is a cross-sectional view taken along lines 17—17 of FIG. 16;

FIG. 18 is a partially cut-away view showing the details of the slit and mirror assembly of the embodiment of FIG. 16; and FIG. 19 is a cross-sectional view taken along lines 19—19 of FIG. 16.

INTRODUCTION

Figure 1:
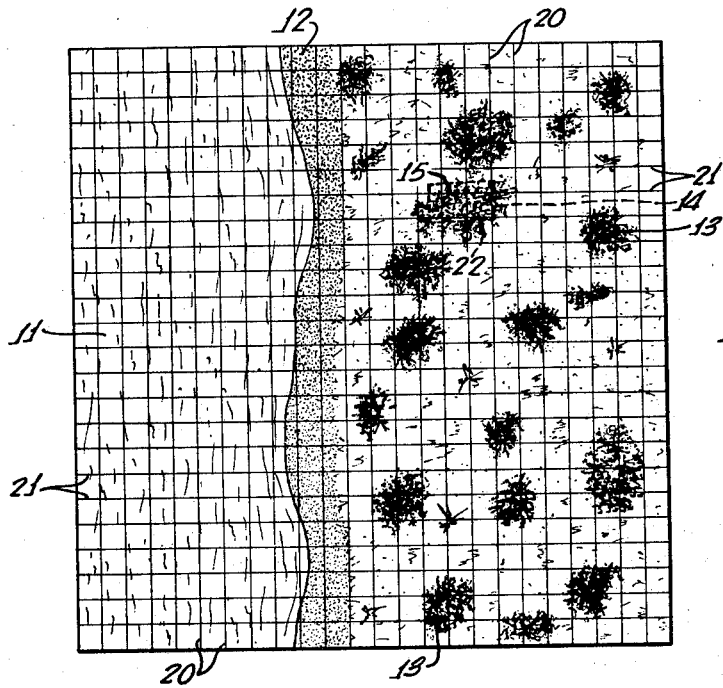
FIG. 1 is an aerial view of a typical scene containing water, sand, growing vegetation and a camouflage provided by cut vegetation all overlaid with a grid representing the spatial and spectral sensing provided by this invention.

As an introduction to this invention, there is shown in FIG. 1 a scene 10 as viewed from above the earth. A portion of this scene is occupied by water 11 and sand 12, and another portion by green vegetation 13. In addition, an armored tank 14 is shown in dotted lines beneath a camouflage covering of cut vegetation 15. The detection of such a camouflage is exceedingly difficult by visual viewing or photographic techniques. Even objects disguised by the relatively simple expedient of painting them to match the natural environs are often difficult to spot by conventional techniques. It is the function of this invention to provide an image spectrophotometer which simultaneously senses spatial and spectral information from a scene such as that shown in FIG. 1 for accurately discriminating between the various objects in a given scene.

This spatial and spectral sensing is represented in FIG. 1 by a grid formed by parallel and equidistant vertical lines 20 and parallel and equidistant horizontal lines 21. Each portion of the scene bounded by adjacent horizontal and vertical lines, e.g. the square denoted as 22, represents one resolution element for which the instrument of this invention provides both the spatial coordinants and the spectral signature.

Figure 2:
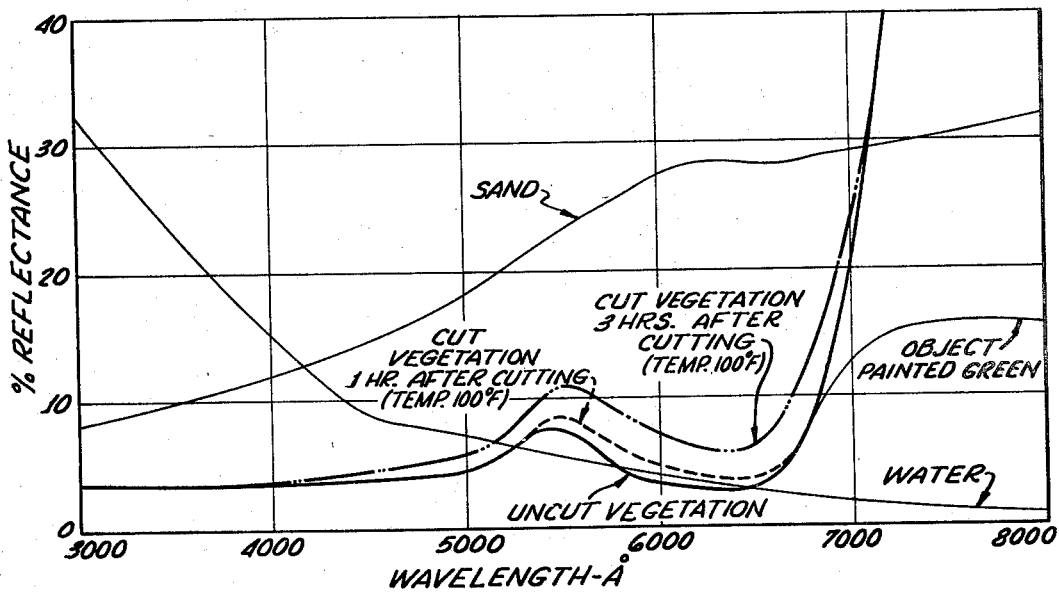
FIG. 2 is a graph on which is plotted the spectral signatures of sand, water, cut and uncut vegetation and a green painted object.

As described above, the present invention exploits an invariant characteristic of objects, i.e. every object has a unique distribution of reflected, emitted, and obsorbed radiations. Representative spectral signatures for a group of objects—water; sand; green vegetation, both cut and uncut; and a green painted object—are shown in FIG. 2, wherein the percent of reflectance is plotted along the ordinant axis and the wavelength in angstroms (A.) is plotted along the abscissa. The information shown in the figures covers both the visible spectrum which extends from approximately 4,000 to 7,000 A., a portion of the ultraviolet spectrum extending between 3,000 and 4,000 A., and a portion of the inrfared region between 7,000 and 8,000 A.

Having the means for recording or displaying the spectral signature of a defined area in a scene permits a very critical survey of the various objects in the scene. For example, as shown in FIG. 2, the nature of any object can be identified by comparing the detected spectrum with a catalog of known spectrums. Since this invention readily permits the translation of the spectral information into numerical data, such a comparison may be very quickly and automatically performed by a computer having access to a storage containing nown spectral signatures.

Moreover, a feature of this invention is to provide means for recording or displaying selected portions of the spectrum. In this way, a number of different objects can be discriminated by examining only a few or even a single radiation wavelength. For example, it will be apparent that a 4,200 A. band would be a poor choice for discriminating between sand, vegetation and water since their percent reflectance values at this wavelength differ by less than 10%. However, the reflectance differences are substantial at the 8,000 A. band, i.e. the percent spectral reflectance of sand then being approximately 30, the percent spectral reflectance of uncut vegetation being approximately 70, and the percent spectral reflectance of water being below 2. In this manner, considerable information regarding the scene of FIG. 1 can be obtained by sensing the reflected radiation at only the single wavelength of 8,000 A.

As another example of object discrimination afforded by detecting a single radiation wavelength, note than an object painted green will be clearly exposed when the 8,000 A. wavelength is detected, since the spectral reflectance of the vegetation rises steeply between 7,000 A. and 8,000 A. to a very high value of percent reflectance whereas the green painted object levels off to a value below a percent reflectance of 20.

Figure 3:
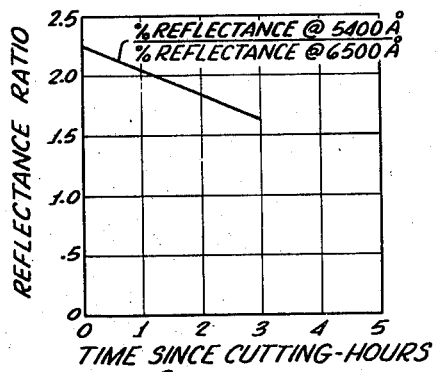
FIG. 3 is a graph showing the variation in reflectance ratio with time following cutting of vegetation when the percent reflectance values at two wavelengths are compared.

FIGS. 2 and 3 further illustrate the manner in which the simultaneous comparison of reflected radiation within only two wavelength ranges enables the detection of the camouflaged tank 14 in FIG. 1. As shown in FIG. 2, the spectral signature of vegetation maintained at 100° F. one hour after cutting differs from that of the uncut vegetation. Additionally, the spectral signature changes with time following cutting as witness the spectral curve for three hours after cutting. This change in spectral signature is measured by obtaining the percent spectral reflectance at a first wavelength in the range between 5200 A. and 5500 A. and the percent spectral reflectance at a second wavelength in the range between 6300 A. and 6800 A. and computing the ratio of the two values of percent reflectance. By way of specific example, in FIG. 3, the ratio of percent reflectances at two selected wavelengths is plotted against the time in hours following the cutting of vegetation, the curve showing the change in reflectance ratio time of cutting when the percent reflectance at 5400 A. is divided by the percent reflectance at 6500 A. As shown, the reflectance ratio prior to cutting changes in less than one hour after cutting, dropping to an entirely different value three hours after cutting. Accordingly, selectively sensing two predetermined wavelengths provides sufficient information for distinguishing a cut area from an uncut area, thus permitting detection of possibly camouflaged areas which to the eye, camera or television camera appear identical to the surrounding vegetation.

DESCRIPTION OF IMAGE SPECTROPHOTOMETER

Structural configuration

A schematic, blown-up view in perspective of the preferred embodiment of this invention is shown in FIG. 4. The reflected radiation from the scene being viewed is reflected off of the mirror 30 and focused onto a slit assembly 31 by objective assembly 32. This slit assambly is opaque to all but a narrow band of the scene and is located at the first focal point of a collimator assembly 33. Collimator 33 forms a part of a spectroscope 34 including a diffraction grating 35 and focusing optics 36. In this spectroscope, parallel bundles of polychromatic light corresponding to that passing through the slit 31 are formed by the collimator 33 and directed onto the diffraction grating 35 which functions as a dispersing element. The emergent dispersed radiation from the diffraction grating is focused by optics 36 onto the face of an image tube 37 which converts selected wavelengths of the spectrum formed by the spectroscope into an electrical signal on output lead 38. This image tube is advantageously a television tube in which the light from the spectroscope 34 is focused on the face of a photosensitive surface 39 and an associated target is scanned by an electron beam such that the beam of the vidicon or electron image of the image disector is swept horizontally and then rapidly retraced while simultaneously moved vertically at a slower rate. The resultant pattern, known as a raster, consists of a close-spaced array of horizontal lines. As described in detail below, the present invention contemplates use of both the entire raster and also only selected portions thereof.

Operation

The operation of the image spectrophotometer of FIG. 4 is as follows: The mirror 30 and objective 32 provide a means for optically scanning the scene, a portion of which is formed into an elemental image by the slit assembly 31. When the instrument and the scene being scanned are stationary with respect to each other, mirror 30 is rotated by motor 50 about a horizontal axis 51 such that the image focused onto the slit 31 is moved the width of this slit in the time that it takes the image tube 37 to scan its raster. In this manner, a series of elemental images are formed on the photosensitive surface of the image tube and successively scanned by the tube. When the instrument of FIG. 4 is mounted in a moving vehicle such as an aircraft or satellite moving above the earth, the rotational movement of the mirror is synchronized with the movement of the craft so as to compensate for the latter movement. Thus, it will be apparent that if the mirror is maintained stationary and the instrument is moved a predetermined speed relative to the earth, the image will be advanced across the slit 31 at a rate corresponding to the scanning rate of the image tube 37. For craft speeds other than this synchronous speed, the mirror is rotated so as to maintain the relative movement of the image past the slit and the scanning rate of the image converter in synchronization. An increased scanning rate, i.e. more scans of a given scene per unit of time, is provided by either using a multi-sided mirror or oscillating the mirror about axis 51.

The spectroscope disperses each elemental image formed by the slit assembly 31 into a spectrum. Selected wavelength portions of this spectrum are electronically scanned by scanning image tube 37 and an electrical output signal on lead 38 from the tube varies in amplitude according to the light intensity sensed along the selected scanned wavelengths.

Airborne application

Figure 5:
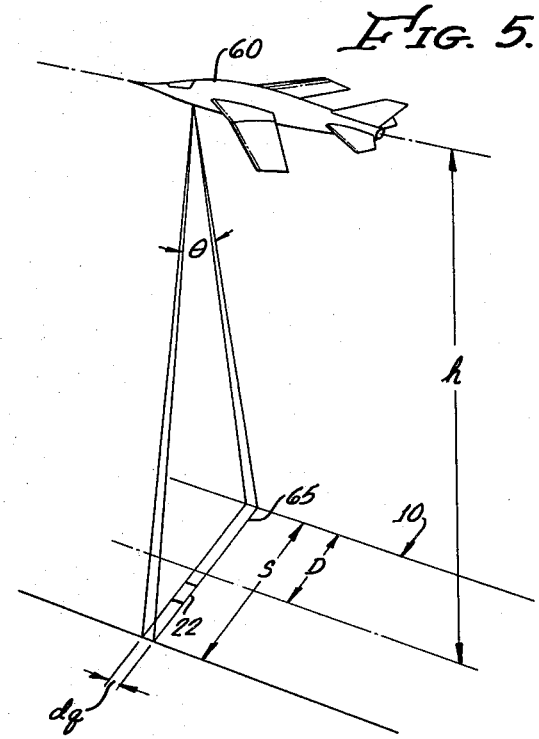
FIG. 5 is a perspective view showing a typical application of the embodiment of FIG. 4 in an airborne vehicle.
Figure 6:
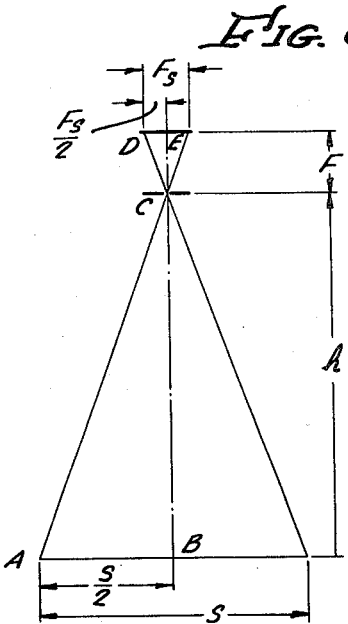
FIG. 6 is a diagrammatic drawing relating the viewing strip to the optical focal length of the image spectrophotometer of FIG. 4.

The operation of an airborne mounted unit is illustrated in FIG. 5 wherein an aircraft 60 is flying at a velocity $V_a$ with respect to the earth at an altitude of $h$ feet. The scene 10 below corresponds to the scene of FIG. 1 and is viewed by the image spectrophotometer of this invention through a field having an angle $\theta$. The elemental image or portion of the scene image passed through the slit 31 (FIG. 4) comprises a narrow rectangular strip 65 subtended by the angle $\theta$ having a width $dq$ on the ground defining the length of the resolution element 22 (FIGS. 1 and 5) and encompassing a plurality of side-by-side resolution elements along its length S. The length of S is related to the altitude $h$, the image tube format size $F_S$ and the focal length F of the optical system of FIG. 4 in accordance with the diagrammatic drawing of FIG. 6. In this diagram, the assumptions are made that the object scene is an infinity so that the image will be at one focal length from the optics and that all three sets of optics 32, 33 and 36 have the same focal length F. Considering the two right triangles ABC and DEC, it will be apparent that these are two similar triangles whose opposite sides are related as follows:

$$\frac{S/2}{h} = \frac{F_s/2}{F} \quad (1)$$

From equation 1, the distance S can be related to $h$, $F_S$ and F as $$S = \frac{F_s h}{F} \quad (2)$$

Similarly, the length of $dq$ is related to the slit width ($W_S$), $h$ and F as $$dq = \frac{W_s h}{F} \quad (3)$$

The narrow viewing width $dq$ is in effect moved across the scene at a rate in sync with the image converter tube 37 by the combination of the aircraft flight speed $V_a$ and the rotational movement of the mirror 30. Representative modes of operation of the image spectrophotometer include a scene storage mode in which the strip 65 is passed over any given scene and a real time display mode in which the strip is continuously moved across the earth to present a continuous display of the scene appearing below the craft.

Detailed description of electronic scanning of spectrum

Figure 7:
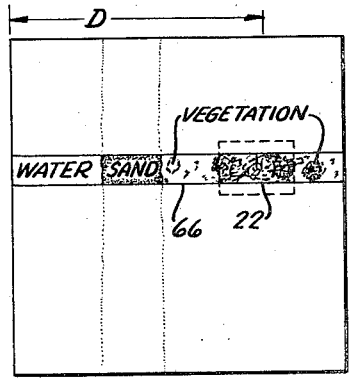
FIG. 7 illustrates a particular one of the elemental images provided by the image spectrophotometer of FIG. 4.

The operation of the invention is further illustrated in FIGS. 7 and 8. FIG. 7 shows a particular one of the arrays of elemental images 66 formed by the strip 65. The light rays from this portion of the scene are dispersed by the spectroscope across the sensitive face of the image tube 37. An example of this dispersed image is illustrated within the limitations of a pen and ink drawing in FIG. 8. Advantageously, the scan is moved along a selected portion of said spectrum of substantially constant wavelength. Thus, in the example shown, the continuous spectrum is scanned only along preselected wavelengths, these wavelengths being selected at 500 A. intervals beginning at 3000 A. and ending in 8000 A. Each selected radiation wavelength is scanned by a single line of the horizontal raster. This mode of operation is shown in FIG. 9 wherein the image tube has a typical raster 67 formed by the rapid horizontal sweep and slower vertical sweep of the electronic scan. Generally, such a raster comprises between 25 and 700 horizontal lines 68. Only a selected number of these lines, however, are ordinarily used in the embodiment described herein corresponding to the number of radiation frequencies to be detected. For example, only the eleven lines 70, 71, 72, 73, 74, 75, 76, 77, 78, 79 and 80 need be scanned to scan the spectrum of FIG. 8 at 500 A. intervals. It will be noted, however, that the system has a very sizable capacity for gathering spectral information since a 700 line raster will generate the radiation reflectance values at 700 discrete wavelengths. The particular use of the instrument will generally dictate the scanning of a substantially fewer number of wavelengths, not only because of the problem in handling such large amounts of data but also because, as shown above, a very substantial amount of information can be obtained by detecting only a few wavelengths or even a single wavelength of reflected light energy.

Each horizontal line of the raster which is scanned converts the detected radiation intensity into a corresponding electrical analog signal. Thus, the water at 3000 A. has a relatively high percent reflectance, considerably higher than sand or vegetation as shown in FIG. 2, and correspondingly different output signals are generated at the output of tube 37 as the horizontal raster line 70 is scanned from left to right along the 3000 A. wavelength of the spectrum shown in FIG. 8.

Information contained in scanned spectrum

The spectrum shown in FIG. 8 provides both the spatial and spectral information simultaneously. Thus, the coordinants of the strip 65 being viewed can be precisely determined in conjunction with the known position of the image spectrophotometer with respect to ground and the angular position of the mirror 30, and its length and width dimensions S and $dq$ can be determined from Equations 2 and 3. The radiation detected along the path of the scanning beam is spatially oriented to the elemental image so that the radiation detected at any point X (FIG. 8) along the path of the beam corresponds to the reflected radiation at the selected wavelength from a corresponding point D (FIG. 7) of the elemental image, where $$D = \frac{X}{F_s} S \quad (4)$$

the distance S being calculated according to Equation 2. In this manner, the dispersed spectrum applied to the face of the image converter can be correlated along the horizontal axis with respect to the strip 65 of FIG. 5 so as to precisely locate any individual resolution element 22 in the strip 65. Within this resolution element, the spectral signature over the range of the instrument, e.g. 3000 to 8000 A. for the spectrum of FIG. 8, can be displayed or recorded.

An advantage of the invention is that each horizontal line of the raster 67 (FIG. 9) is very narrow so that a very narrow band of the spectrum and hence a very narrow band of wavelengths can be discriminated. Therefore, regardless of the number of horizontal lines scanned, be it one or seven hundred, the band of wavelengths measured at each line may be the same low value, thus providing a very high degree of resolution independent of the quantity of spectral information gathered. Moreover, the resolution of the image spectrophotometer can be changed by varying the angle of dispersion. For example, if even higher resolution is required, the dispersion element, be it a transmission diffraction grating, reflection diffraction grating or prism, is selected to provide a larger angle of dispersion so that only a portion of the spectrum fits within the format of the image tube. This, of course, will have the effect of eliminating a band of wavelengths at either or both ends of the spectrum, depending upon the orientation of the dispersion means, but will serve to increase the resolution of that portion of the spectrum impinging on the light sensitive photocathode. If, on the other hand, lower resolution is satisfactory, a smaller angle of dispersion will be selected so that instead of the spectrum 90a filling the entire format 90 of the image converter tube 37, as shown in FIG. 10a, the spectrum 91b will fill up half (FIG. 10b) or even less (spectrum 91c shown in FIG. 10c) of the input face of this tube. Horizontal scan lines would be selected as described above, each line scanning a broader band of wavelengths in the embodiments of FIGS. 10b and 10c than in the embodiment of FIG. 10a. There is a correlative advantage to be obtained from the reduced dispersion angle (if the lower resolution can be tolerated) in that the light focused on the tube will increase in intensity as the angle of dispersion is reduced. Since all image tubes have a finite sensitivity, a lower value of wavelength resolution may thus be selected to improve the signal-to-noise ratio of the instrument for a given application.

Suitable dispersing elements

Dispersing elements suitable for use in the image spectrophotometer include transmission diffraction gratings, reflection diffraction gratings and prisms. Diffraction gratings in general have the advantages of light weight and linear dispersion, compared to prisms which are heavier and have a non-linear dispersion. As is known in the art, the dispersion angle of these devices is dependent upon physical characteristics of the devices—the grating spacing for the diffraction gratings and the prism angle and refractive glass index for the prism elements. The narrow dispersion angle of a prism may be further increased by using a train of two or more prisms.

Suitable image converter tubes

Image converter tubes suitable for use in the image spectrophotometer include the secondary emission conductance (SEC) vidicon, the image disector, the vidicon, the plumbicon and the image orthicon. Any of these tubes may be used in conjunction with an image converter or image intensifier. The SEC vidicon and image disector are generally preferred since they do not leave any appreciable charge on the target after scanning, whereas the vidicon, the image orthicon and to a lesser extent, the plumbicon leave a substantial charge pattern on the photosurface or target when scanned. Accordingly, these latter tubes ordinarily require an erase mode between scans in which a higher current, defocused beam is scanned over the photosurface. The SEC vidicon and the image orthicon are more sensitive than the plumbicon, and the image disector and vidicon are the least sensitive among these tubes. However, any of these may be equipped with an image intensifier, which, while adding complexity, will extend the region of spectral sensitivity or enable operation at low light levels.

Further, the SEC vidicon, image disector and image orthicon are obtainable with a wide range of photocathodes with various spectral ranges, some of which are broad enough to cover a spectrum from 3000 to in excess of 10,000 A. For high transmission in the ultraviolet region of 3000 A., special fused silica faceplates are available for providing a substantially higher light transmission than the non-ultraviolet transmitting faceplate normally supplied with these tubes.

SYSTEM EMBODYING IMAGE SPECTROPHOTOMETER

System as a whole

A system including the image spectrophotometer is shown schematically in the block diagram of FIG. 11. In this system, the vertical sync generator 100 synchronously drives the mirror control stage 101. Stage 101 further includes the input $V_a/h$ for controlling the rotational rate of the mirror so that the scene is moved through one slit width for each vertical scan of the output of the vertical sync generator 100.

The rotational velocity $\omega$ for the mirror is defined by the equation $$\omega = \left(\frac{V_a}{h}\right)_d - \frac{V_a}{h} \text{ radius/sec.} \qquad (5)$$

where the quantity $$\left(\frac{V_a}{h}\right)_d$$

is the particular craft velocity to height ratio at which the scanning rate of the scene corresponds to the vertical scan of the image tube; hence the mirror movement or $\omega$ is zero for this particular ratio. For other values of $V_a/h$, the mirror is rotated in accordance with this Equation 5 to advance or retend the image across the slit 31 according to whether the actual ratio of $V_a/h$ is less than or greater than the quantity $$\left(\frac{V_a}{h}\right)_d$$

In most applications, the craft altitude and speed will be such as to warrant a very slow rotational rate for the scanning mirror, e.g. of the order of $\frac{1}{10}$ r.p.m. As a result, there will be a time delay if the mirror is rotated at a constant rate after it completes its scanning of the field of view which is of interest. Such time delay would result in a loss of picture information between picture scans. The scanning mirror is therefore preferably driven by stage 101 in an oscillatory mode in which the mirror rotates from a start to a finish position to cover the field of view and then is rapidly reversed in direction to the start position. Other operational modes which may be used include an intermittent rotational mode wherein the mirror is moved only during the vertical retrace time of the image converter tube and remains stationary while the tube is scanning the raster.

As shown in FIG. 11, a horizontal sync generator 105 is coupled to the vertical sync generator 100 so as to properly synchronize the horizontal sweep with respect to the vertical sweep and both the vertical and horizontal sync generators are operatively coupled to the image tube 37 by respective leads 106, 107 for driving the electron scanning beam.

Details of vertical sweep

The vertical sync generator 100 advantageously includes a vertical scan selector 110. This selector enables the operator to selectively scan predetermined horizontal lines of the raster of the image tube 37 as shown by the representative vertical sweep voltages in FIGS. 12a, b, c and d. The circuitry required for generating the sweep voltages shown in FIGS. 12a, b, c and d is well known in the art and is therefore not described in further detail herein. Thus, the customary vertical sync signal is shown in FIG. 12a comprising a periodic sawtooth waveform 115 in which the electron beam is swept from the top to the bottom of the target during a single vertical sweep period $\tau$. This type of vertical sync signal, when applied to the lead 107 of the image tube 37, would cause the electron beam to scan the entire raster. Accordingly, if the tube has a raster composed of 300 lines, each of the 300 lines will be scanned and the information applied to the output lead 38. As noted above, it will generally be advantageous to scan a substantially fewer number of lines than the entire raster. The operation is achieved by using the sweep signal shown in FIG. 12b comprising the step function 116. The scanning beam then is caused to move over only preselected horizontal lines of the raster. For example, for the raster shown in FIG. 9, eleven steps 117 are used for scanning only the eleven horizontal lines 70–80, with the vertical and horizontal sweeps synchronized to that vertical movement of the beam occurs during a horizontal blanking interval.

Another feature of the invention is that the vertical scan selector may be pre-programmed to select different horizontal lines from the several hundred in a typical raster. This will enable the instrument to be programmed in accordance with its use so as to provide the maximum useful information with the fewest number of spectral lines having to be detected. A vertical sweep function for this operation is shown in FIG. 12c comprising a series of non-uniform steps 118, the amplitude of each step corresponding to a respective position of the tracing beam at the preselected horizontal line.

Advantageously, the scan selector incorporates a series of control dials 120 for preselecting any one of a plurality of horizontal scan lines in accordance with the wavelength of the energy to be detected. By way of specific example, it was noted above that two ranges of wavelengths, namely 5200–5500 A. and 6300–6800 A., can be used to discriminate the cut from the uncut vegetation. In this case, one of the dials would select a step corresponding to a wavelength in one of the ranges, e.g. 5400 A. and another dial used to select a wavelength in the other of the ranges, e.g. 6500 A. It will thus be apparent that the system of FIG. 11 has the ability of selecting a number of different spectral bands, with each having a very high spectral resolution.

A further advantage of the invention is that the scanning rate of the instrument can be increased by scanning only a selected number of the total number of horizontal lines in the raster. Thus, each of the horizontal lines need be scanned only once during a single scan so that the vertical sync rate can be substantially advanced as represented by the waveform 125 of FIG. 12d in which the beam is moved vertically during each horizontal blanking interval, resulting in each of the selected eleven wavelength bands being scanned only once during each picture scan. This feature enables the instrument to have a very short frame time and thus be compatable with very high speed aircraft and space vehicles. Thus, the maximum frame time $T_f$ is defined by the equation $$T_f = \frac{d_q}{V_a} \quad (6)$$

If, for example, $dq$ is 2 feet and $V_a$ is 850 feet per second, the maximum allowable frame time is less than 3 milliseconds requiring a vertical sweep rate of the order of 400 c.p.s.

Storage and display of data

The analog output signal on the output lead 38 of the image converter tube 37 may be stored in the analog storage means 130, typically a video tape recorder, or displayed on a real time monochrome display 131 or color display 132, typically television monitors, or both stored and displayed at the same time. The vertical and horizontal sync generators 100, 105 are both coupled to the analog storage so that the horizontal and vertical sync pulses may be recorded simultaneously with the video output signal, the magnetic tape typically having three tracks for the picture, vertical sweep and horizontal sweep, respectively, or one track with sync pulses interspersed with the video signal.

It is often convenient to translate into a digital format the analog data from the image tube. Thus, the sensitivity of the system as a whole varies as well as a function of the wavelength due to non-linear spectral response of the photosensitive surface and spectral variation of light from the diffraction grating. Accordingly, this calibration is most conveniently performed in a digital computer so that the storage system advantageously includes an analog to digital converter 140 and a digital storage 141, e.g. a digital tape deck, in which a predetermined number of numeric intensity samples are recorded for each video trace.

The real time monochrome display 131 is typically used for displaying a scene, such as that shown in FIG. 1, in accordance with a selected wavelength of the reflected spectral energy from the scene. In one specific embodiment, the image tube scans only a single wavelength of each elemental image and the resultant signal is applied to the black and white monitor 131. The vertical and horizontal sweeps are maintained in sync with the image tube drive by well-known circuitry so that the detected radiation from the successive elemental images is displayed on successive horizontal lines of the monitor raster. When the scene has been completely optically scanned by the combination of the driven mirror and the image tube, the vertical sync pulse is applied to the monitor in sync with the time that the mirror is returning to its start position so that the start of he picure on the monitor and the start of a new scan of the scene are coincident in time. In this way, the viewer is given the opportunity to study the entire scene in terms of its reflected energy in a single spectral band of very high resolution, e.g. 5 A.

Real time display 132 is a color display for showing data from three wavelengths. An exemplary embodiment includes the well-known color monitor having three electron guns for displaying red, green and blue colors on the face of the tube. The image tube is driven to scan three selected wavelengths in the manner described above and the three guns of the color monitor are coupled to the image tube such that each of the guns is responsive to a different one of the three wavelengths of detected reflected radiation. The image tube and mirror drive are synchronized with the monitor horizontal and vertical sweep so that the scene is displayed on the monitor in terms of the spectral radiation in the three scanned wavelengths converted to the three arbitrary colors of red, green and blue.

The color monitor provides very effective means for visually displaying changes in the reflected radiation from the scene. By way of specific example, the selected wavelengths at the image tube and the intensities of the three colors on the monitor are chosen so that these three colors combine on the monitor screen to produce a particular color such as the achromatic color of white for uncut vegetation and another color such as the chromatic color of red for the cut vegetation in the scene. This color change is due to the reflected radiation changes shown in FIG. 2 between uncut to cut vegetation, these changes being such as to unbalance the light intensities of the three colors and change the display from white to a different color. A camouflage provided by cut vegetation is then easily detected since the observer need only scan the vegetation shown in the scene being viewed for areas which deviate from the achromatic color.

Data normalization

The data obtained from the image tube will usually require normalization because the sensitivity of the system as a whole varies as a function of wavelength. Thus, the spectral response of the photocathode is usually non-linear—a typical spectral response curve for a photocathode being shown in FIG. 13 with both a borosilicate crown glass faceplate (curve 150) and with a fused silica faceplate (curve 151). Each digitally recorded numeric intensity sample is conveniently normalized in a programmed digital computer 155 and the normalized samples stored in a coupled digital storage 156. From this storage, calibrated intensity levels may be read out for any selected resolution element—the number of wavelengths corresponding to the number of lines of the spectrum scanned by the image converter tube.

IMAGE SPECTROPHOTOMETER WITH A SHORT FOCAL LENGTH

Two embodiments of the image spectrophotometer of this invention are shown in detail in FIGS. 14, 15, 16, 17, 18 and 19. FIGS. 14 and 15 illustrate a short focal length instrument having an optical focal length of less than 20 inches in which an angularly rotatable mirror 175 is driven by motor 176. Reflected light from the mirror is passed through the objective lens assembly 177 and focused onto a slit assembly 178 providing a slit 179. The spectroscope portion of the instrument comprises a collimator lens assembly 180, a transmission diffraction grating 181 and a focusing lens assembly 182. The normal axis of the focusing lens 182 is located at an angle $\beta$ with respect to the normal axis of the remainder of the spectroscope in accordance with the angle through which the light rays are bent by the spectroscope. Lens 182 focuses the spectrum onto the photocathode surface of the SEC vidicon 183. The entire apparatus is supported on a mounting plate 185 which is mounted to the aircraft or space vehicle. As shown, this plate may also support the data processing electronics 190 and the image tube electronics 191.

By way of specific example, the following specifications are given for an image spectrophotometer constructed in accordance with FIGS. 13 and 14:

| | |
|---|---|
| $\theta$ (Field of view) | 26° 31′. |
| S (strip length) | [1] 1400 ft. |
| dq (Strip width) | [1] 2 ft. |
| Resolution element | [1] 4 ft.$^2$. |
| Spectral resolution | [1] 5 A. |
| $T_f$ (frame time) | 2.36 millisec. |
| $F_s$ (format size) | .707 by .707 in. |
| F (optical focal length) | 1.5 in. |
| f Number | 1. |
| $W_s$ (slit width) | .001 in. |
| Diffraction grating dispersion | .0064 deg/A. |

[1] For altitude of 3,000 ft.

The embodiment of FIGS. 13 and 14 with the specifications given above is particularly adapted for use in an aircraft flying a tan altitude of the order of 3,000 feet, the dimension of each spatial resolution element is then 2′ x 2′ which is ample for discriminating even small objects on the ground.

IMAGE SPECTROPHOTOMETER WITH A LONG FOCAL LENGTH

A very high resolution image spectrophotometer of long focal length, i.e. over 20 inches, is illustrated in detail in FIGS. 16 through 19. In this embodiment, catadioptric optics are used for providing an extremely long focal length. Thus, as shown, rotating mirror 200 reflects light into the catadioptric objective assembly 201 which focuses the light onto the slit 202 (shown in FIG. 18). The light passing through the slit is reflected off of plane mirror 203 into a catadioptric collimator 204 which combines with a reflection diffraction grating 205 to provide a spectroscope. The light from the diffraction grating is reflected off of a second plane mirror 210 onto the photocathode of the image tube 211. The special advantage of this instrument is that it can have a focal length of the order of 114 in. providing, for example, a spatial resolution element of only 8′ by 8′ at an altitude of 150 miles. This instrument is therefore particularly suited for use in a high altitude space vehicle.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:
1. An apparatus for providing spatially-oriented spectral information concerning a scene comprising
   means for optically scanning a scene and forming a series of elemental images thereof, said means comprising a rotating mirror for reflecting said scene, a slit, and an objective lens forming an image of the reflected scene in the plane of said slit,
   means for dispersing the elemental image formed by said slit and forming a spectrum thereof,
   means for forming a focused image of said spectrum, and
   image tube means responsive to said focused spectral image for converting selected portions of said spectrum into an electrical signal, said means scanning said spectrum at selected wavelengths so that said electrical signal represents the reflected energy from said scene at said selected wavelengths.

2. An apparatus for providing spatially-oriented spectral information concerning a scene comprising
   means for forming an elemental image of a portion of said scene,
   means for dispersing said elemental image into a spectrum, and
   image tube means for scanning a selected region of substantially constant wavelength of said spectrum for detecting the radiation intensity values along the path of said scan and producing a corresponding elemental output signal, the position at any point on said path corresponding to a point on said elemental image so that said electrical output signal is spatially oriented to said elemental image.

3. The apparatus described in claim 2 wherein
   the scan of said image tube is driven by respective horizontal and vertical sweep signals for producing spaced horizontal scanning lines, said spectrum being scanned only along said scanning lines.

4. The apparatus described in claim 3 wherein
   said vertical sweep signal is a step function for moving the scan a predetermined distance between horizontal scanning lines for scanning said spectrum only along preselected wavelengths.

5. The apparatus described in claim 4 wherein
   the vertical and horizontal sweeps are synchronized so that the scan is moved from one horizontal line to the next during a blanking interval of the horizontal sweep signal.

6. The apparatus described in claim 4 wherein
   the vertical and horizontal sweeps are synchronized so that the scan is vertically moved from one horizontal line to the next at the end of each horizontal scan cycle so that each selected wavelength is scanned once during each vertical scan cycle.

7. The apparatus described in claim 2 wherein
   each elemental image comprises a narrow strip of the scene having a longitudinal dimension S and a width dq, said means for forming a series of elemental images of said scene including a slit having a width $W_s$, the length of distance S being defined by the relationship $$S=\frac{F_s h}{F}$$

where $F_s$ is the format size of said scanning image tube, $h$ is the altitude of said apparatus above said scene and F is the focal length of said apparatus, and the length of dq being defined by the relationship $$dq=\frac{W_s h}{F}$$

8. The apparatus described in claim 2 wherein
   said scanning image tube includes a radiation sensitive photosensitive surface of predetermined format, and said means for dispersing the elemental image forms a spectrum covering a predetermined portion of the format of said scanning image tube for locating a predetermined wavelength band within each scanning line.

9. The apparatus described in claim 8 wherein
   said dispersing means produces a spectrum covering substantially the entire format of said scanning image tube.

10. The apparatus described in claim 8 wherein
said means for dispersing the elemental image forms a spectrum larger than the format of said scanning tube for locating a smaller band of wavelengths in each horizontal scanning line for a selected portion of said spectrum.

11. The apparatus described in claim 8 wherein
said means for dispersing the elemental image forms a spectrum occupying less than the format of said scanning image tube for locating a larger band of wavelengths within each horizontal scanning line and producing an increased radiation intensity on the photosensitive surface of said image tube.

12. The apparatus described in claim 2 wherein
said apparatus detects the radiation intensity along two or more selected regions of substantially constant wavelength for detecting the radiation at selected wavelengths, said apparatus including means for comparing said measured values for discriminating objects by comparison of selected portions of their respective spectral signatures.

13. The apparatus described in claim 12 for discriminating between cut and uncut vegetation wherein one of said selected regions of constant wavelength is at any wavelength between 5200 A. and 5500 A. and another of said selected regions of constant wavelength is at any wavelength between 6300 A. and 6800 A. and means for computing the ratio of the electrical output signals corresponding to the regions, said ratio having a substantially constant value for uncut vegetation and a different value changing with time following cutting of said vegetation.

14. The apparatus described in claim 2 wherein said electrical output signal is an analog waveform, said apparatus further comprising
means responsive to said analog waveform and a signal defining the movement of said scan for converting said analog signal into digital data encoding both a spatial orientation and a numeric value corresponding to a reflectance value at a predetermined wavelength.

15. The apparatus described in claim 14 comprising
means for normalizing said digital data for compensating for non-linear sensitivity of the system as a function of wavelength, including the non-linear spectral response characteristics of said image converter means.

16. The apparatus described in claim 2 having a real time display comprising
a monochrome television monitor, and
means for coupling said scanning image tube to said television monitor so that the electrical output signal from said scanning image tube reproduces a black and white image corresponding to the radiation of said selected region of substantially constant wavelength.

17. The apparatus described in claim 2 having a real time display comprising
a color television monitor having three electron guns for displaying three distinct colors, said image tube detecting the radiation intensity values along three constant wavelengths, and
means for coupling said image tube to said color television monitor so that said three electron guns are respectively responsive to said three detected radiation intensity values.

18. The apparatus described in claim 17 wherein
the three selected wavelengths at the scanning image tube and the intensities of the three colors on the color monitor are selected so that the three colors combine on the monitor screen to produce a first predetermined color for a particular feature in a scene such as uncut vegetation and a second predetermined color for another feature in the scene such as cut vegetation.

19. The apparatus described in claim 18 wherein
one of said predetermined colors produced on the monitor screen is an achromatic color and the other of said predetermined colors is a chromatic color.

20. An apparatus for providing spatially-oriented spectral information concerning a scene comprising
means for forming an elemental image of a portion of said scene,
means for dispersing said elemental image into a spectrum, and
a radiation sensitive scanning image tube receiving said spectrum, said tube including
means for scanning along a selected portion of said spectrum of substantially constant wavelength, the radiation along the path of said scan being spatially oriented to the elemental image so that the radiation detected at any point along said path corresponds to the reflectance radiation of said selected wavelength from a corresponding point of said elemental image, said tube producing an electrical output signal having a waveform which varies in accordance with the radiation detected along the path of said scan.

21. An apparatus for resolving a scene into a plurality of uniform spatially located elements and producing multi-wavelength spectral information concerning any one of said elements comprising
means for forming a generally rectangle elemental image of a portion of said scene, the portion of said scene included in the elemental image defining the length of the spatially located elements along its shorter dimension and encompassing a plurality of side-by-side elements along its longer dimension,
means for dispersing said elemental image into a spectrum, and
means for scanning the radiation intensity along selected wavelengths of said spectrum for detecting the radiation intensity at said selected wavelength in each of the elements included within said elemental image.

22. A system for providing spatially-oriented spectral information concerning a scene viewed from a moving platform comprising
means for optically scanning a scene and forming a series of elemental images thereof, said means comprising a rotating mirror for reflecting said scene, a slit, and an objective lens forming an image of the reflected scene in the plane of said slit,
means for dispersing the elemental image formed by said slit and forming a spectrum thereof,
means for forming a focused image of said spectrum,
means responsive to said focused spectral image for converting selected portions of said spectrum into an electrical signal, said means scanning said spectrum at selected wavelength so that said electrical signal represents the reflectance energy from said scene at said selected wavelengths, and
means for synchronizing rotation of said rotating mirror with movement of said moving platform so that the reflected image of the scene is advanced through one slit width for a completed scanning cycle of said selected wavelengths by said image tube means.

23. The system described in claim 22 wherein
said means for synchronizing rotation of said rotation mirror is responsive to both the velocity $V_a$ of the platform and the altitude $h$ of the platform and rotates the mirror at a rate determined by the ratio of $V_a$ to $h$.

24. The system described in claim 22 wherein
said mirror is driven in an oscillatory mode wherein the mirror rotates from a predetermined start to a predetermined finish position to cover the scene and then is rapidly reversed to the start position.

25. The system described in claim 22 wherein the scan of said image tube is driven by respective horizontal and vertical sweep signals for producing spaced horizontal scanning lines, and said mirror is intermittently rotated during vertical retrace of the scan and remaining stationary when the scan is scanning the horizontal scanning lines.

26. A system for providing a real time display of a scene in terms of its reflected energy in a selected spectral band of high resolution comprising means for optically scanning a scene and forming a series of elemental images thereof, said means including a slit, a lens forming an image of the scene in the plane of said slit, and means for moving said image relative to said slit, means for dispersing said elemental image into a spectrum, image tube means for scanning a selected region of substantially constant wavelength of said spectrum for detecting the radiation intensity values along the path of said scan and producing a corresponding elemental output signal, a television monitor coupled to said output signal, and means for synchronizing said means for moving said image, said image tube means and said television monitor so that the detected radiation from the successive elemental images is displayed on successive horizontal lines of the monitor raster.

27. An apparatus for providing spatially-oriented spectral information concerning a scene having a focal length less than 20 inches comprising a selectively movable mirror for reflecting said scene, a slit, and an objective lens forming an image of the reflected scene in the plane of said slit for optically scanning the scene and forming a series of elemental images thereof, a collimator lens for forming parallel bundles of polychromatic light corresponding to the light passing through said slit, a transmission diffraction grating situated in said parallel bundles of polychromatic light for dispersing the elemental image formed by said slit and forming a spectrum thereof, a lens for forming a focused image of said spectrum, and a scanning image tube responsive to said focused spectral image for converting selected portions of said spectrum into an electrical signal, said means scanning said spectrum at selected wavelengths so that said electrical signal represents the reflected energy from said scene at said selected wavelengths.

28. The apparatus described in claim 27 wherein said objective lens, said collimator lens and said spectrum focusing lens each have the same focal length less than 20 inches.

29. An apparatus for providing spatially-oriented spectral information concerning a scene having a focal length greater than 20 inches, comprising a selectively movable mirror for reflecting said scene, a slit, and a catadioptric objective lens assembly forming an image of the reflected scene in the plane of said slit for optically scanning the scene and forming a series of elemental images thereof, a catadioptric collimator lens assembly, a first plane mirror for reflecting the light emerging from said slit into said catadioptric collimator lens, a reflection diffraction grating situated in the light emerging from said catadioptric collimator lens for dispersing the elemental image formed by said slit and forming a spectrum thereof, an image tube having a photosensitive surface, and means including a second plane mirror for reflecting the dispersed light from said reflection diffraction grating onto the photosensitive surface of said image tube.

30. The method for providing spatially-oriented spectral information concerning a scene comprising the steps of optically forming an elemental image of the scene, dispersing the elemental image into its spectrum, focusing said spectrum onto the photosensitive surface of a scanning image tube, and scanning along selected linear paths corresponding to regions of substantially constant wavelengths of the spectrum formed on the photosensitive surface for producing an electrical waveform which varies in accordance with the intensity of the impinging radiation upon the photosensitive surface within said linear paths.

References Cited
UNITED STATES PATENTS

| | | | |
|---|---|---|---|
| 2,324,270 | 7/1943 | Schlesman | 356—84 |
| 3,191,487 | 6/1965 | Kruythoff | 350—168 |

ROBERT L. GRIFFIN, Primary Examiner

J. C. MARTIN, Assistant Examiner

U.S. Cl. X.R.

178—5.2